United States Patent
Wang

(10) Patent No.: US 9,755,749 B2
(45) Date of Patent: Sep. 5, 2017

(54) ONU, COMMUNICATION SYSTEM AND COMMUNICATION METHOD FOR ONU

(71) Applicant: ZTE Corporation, Shenzhen, Guangdong (CN)

(72) Inventor: Rihong Wang, Shenzhen (CN)

(73) Assignee: ZTE CORPORATION, Shenzhen, Guangdong (CN)

( * ) Notice: Subject to any disclaimer, the term of this patent is extended or adjusted under 35 U.S.C. 154(b) by 0 days.

(21) Appl. No.: 14/894,071

(22) PCT Filed: May 21, 2014

(86) PCT No.: PCT/CN2014/078041
§ 371 (c)(1),
(2) Date: Nov. 25, 2015

(87) PCT Pub. No.: WO2014/194760
PCT Pub. Date: Dec. 11, 2014

(65) Prior Publication Data
US 2016/0119058 A1    Apr. 28, 2016

(30) Foreign Application Priority Data

Jun. 4, 2013   (CN) .......................... 2013 1 0219082

(51) Int. Cl.
*H04B 10/20*    (2006.01)
*H04J 14/00*    (2006.01)
(Continued)

(52) U.S. Cl.
CPC ........... *H04B 10/27* (2013.01); *H04B 10/272* (2013.01); *H04Q 2011/0064* (2013.01)

(58) Field of Classification Search
USPC ...................................... 398/43, 58
See application file for complete search history.

(56) References Cited

U.S. PATENT DOCUMENTS 5,903,372 A * 5/1999 Czerwiec ............ H04L 12/2801
340/2.21
6,964,539 B2    11/2005 Bradley
(Continued)

FOREIGN PATENT DOCUMENTS

CN    1315019 A    9/2001
CN    1863013 A    11/2006
(Continued)

OTHER PUBLICATIONS

Supplementary European Search Report in European application No. 14807816.5, mailed on May 25, 2016.
(Continued)

*Primary Examiner* — David Payne
*Assistant Examiner* — Pranesh Barua
(74) *Attorney, Agent, or Firm* — Oppedahl Patent Law Firm LLC

(57) ABSTRACT

Disclosed are an ONU, a communication system and a communication method for an ONU. The ONU provided in the present disclosure includes a processing module and at least two user interface modules. At least two ONU sub-modules are disposed in the processing module. The disposed ONU sub-modules are corresponding to the user interface modules in a one-to-one manner. Each ONU sub-module processes the user side data from a corresponding user interface module.

12 Claims, 5 Drawing Sheets

(51) Int. Cl.
*H04B 10/27* (2013.01)
*H04B 10/272* (2013.01)
*H04Q 11/00* (2006.01)

(56) References Cited

U.S. PATENT DOCUMENTS

| | | | | |
|---|---|---|---|---|
| 7,181,142 | B1* | 2/2007 | Xu | H04J 3/14 398/58 |
| 7,272,137 | B2* | 9/2007 | Unitt | H04L 29/06 370/389 |
| 7,620,325 | B2* | 11/2009 | Mizutani | H04L 12/5695 370/395.4 |
| 8,320,760 | B1* | 11/2012 | Lam | H04J 14/002 398/66 |
| 8,363,656 | B2 | 1/2013 | Klink | |
| 2003/0177406 | A1 | 9/2003 | Bradley et al. | |
| 2004/0062256 | A1* | 4/2004 | Takeuchi | H04L 12/2801 370/401 |
| 2004/0264961 | A1* | 12/2004 | Nam | H04Q 11/0067 398/58 |
| 2005/0013611 | A1* | 1/2005 | Lee | H04J 3/1617 398/51 |
| 2007/0133989 | A1* | 6/2007 | Kim | H04J 3/1694 398/69 |
| 2008/0267626 | A1* | 10/2008 | Niu | H04L 12/185 398/66 |
| 2008/0279549 | A1* | 11/2008 | Kazawa | H04B 10/0773 398/17 |
| 2008/0298799 | A1* | 12/2008 | Takihiro | H04L 12/2861 398/2 |
| 2008/0304828 | A1* | 12/2008 | Mizutani | H04B 1/707 398/78 |
| 2009/0245790 | A1* | 10/2009 | Mizutani | H04J 14/0282 398/43 |
| 2010/0178051 | A1* | 7/2010 | Mizutani | H04J 3/0652 398/25 |
| 2011/0103792 | A1* | 5/2011 | Kimura | H04B 10/032 398/2 |
| 2011/0243554 | A1* | 10/2011 | Niibe | H04B 10/0793 398/38 |
| 2012/0063458 | A1 | 3/2012 | Klink | |
| 2012/0141119 | A1* | 6/2012 | Konno | H04L 12/12 398/25 |
| 2012/0308228 | A1* | 12/2012 | Tanaka | H04L 12/413 398/25 |
| 2013/0039656 | A1* | 2/2013 | Lam | H04J 14/0282 398/47 |
| 2013/0156426 | A1* | 6/2013 | Kim | H04B 10/272 398/45 |
| 2014/0099101 | A1* | 4/2014 | Elhage | H04L 41/145 398/25 |
| 2015/0207587 | A1* | 7/2015 | Laraqui | H04J 14/0272 398/68 |
| 2016/0056888 | A1* | 2/2016 | Sun | H04B 10/038 398/2 |

FOREIGN PATENT DOCUMENTS

| | | |
|---|---|---|
| CN | 201114078 Y | 9/2008 |
| CN | 101312377 A | 11/2008 |
| CN | 101562480 A | 10/2009 |
| CN | 101836379 A | 9/2010 |
| CN | 102271059 A | 12/2011 |
| CN | 103109516 A | 5/2013 |
| EP | 1976197 A1 | 10/2008 |
| EP | 2501058 A1 | 9/2012 |
| JP | 09061678 A | 3/1997 |
| JP | 2005229206 A | 8/2005 |
| JP | 2007074256 A | 3/2007 |
| JP | 2008277962 A | 11/2008 |
| JP | 2012528493 A | 11/2012 |

OTHER PUBLICATIONS

International Search Report in international application No. PCT/CN2014/078041, mailed on Jul. 29, 2014.
English Translation of the Written Opinion of the International Search Authority in international application No. PCT/CN2014/078041, mailed on Jul. 28, 2014.

* cited by examiner

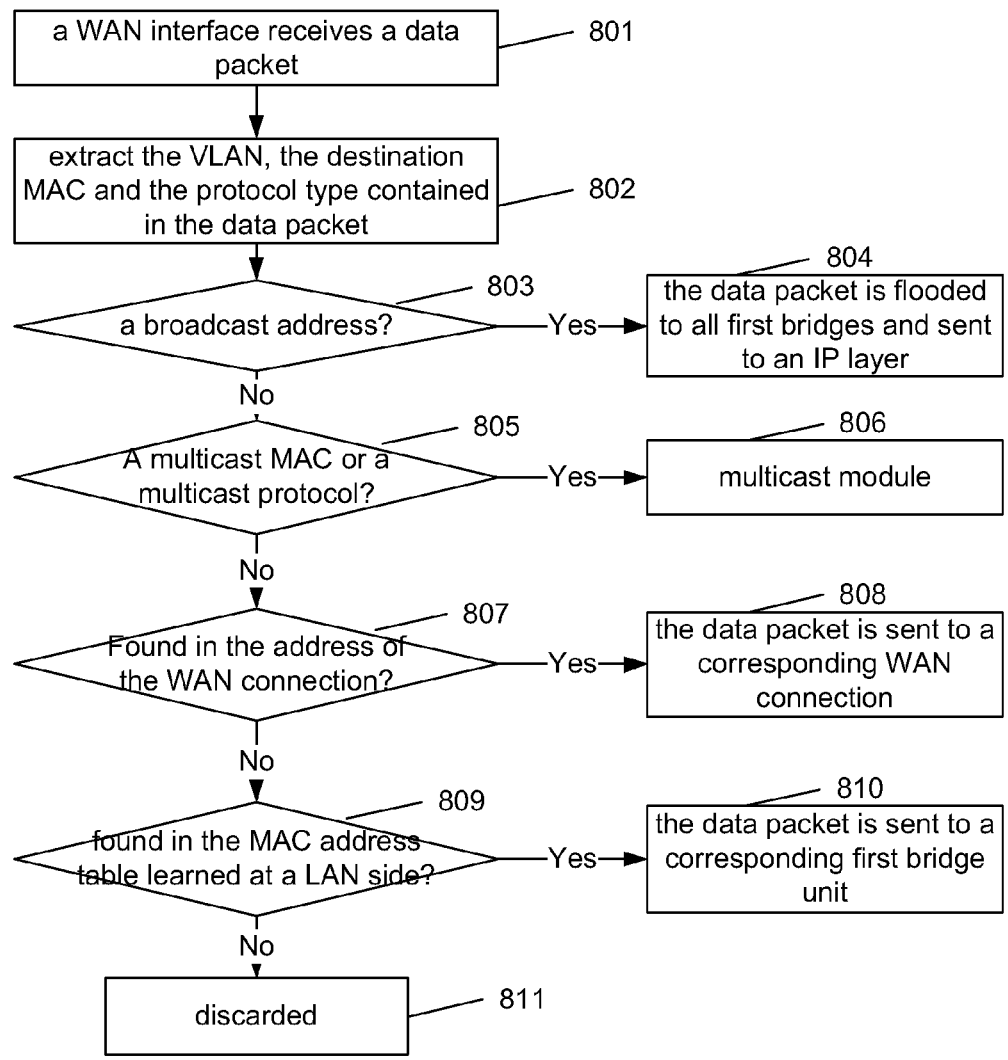

ONU, COMMUNICATION SYSTEM AND COMMUNICATION METHOD FOR ONU

TECHNICAL FIELD

The present disclosure relates to the field of communications, and more particularly, to an ONU, a communication system and a communication method for an ONU.

BACKGROUND

An Optical Line Terminal (OLT) is a terminal device for connecting to an optical fiber trunk, which can achieve functions of controlling and managing Customer Premises Equipment, i.e., Optical Network Unit (ONU). The ONU is an optical access network device which is generally used in a corridor or at a home in Integrated Terminal Management System (ITMS).

TR069 (DSL Forum CPE WAN Management Protocol) is one of the technical specifications developed by the DSL (Digital Subscriber Line) forum and is entitled CPE (Customer Premises Equipment) WAN (Wide Area Network) Management Protocol. It provides a general framework and protocol for managing and configuring home network devices in the next generation network so as to provide, at a network side, a remote centralized management on the devices in a home network including a gateway, a router, a set top box and the like.

Wide Area Network (WAN) connection refers to a way of connecting a device to a WAN. For example, a home gateway is generally connected to the outside via an Asymmetrical Digital Subscriber Loop (ADSL), a Local Area Network (LAN), the Ethernet or an Ethernet Passive Optical Network (EPON)/Gigabit Passive Optical Network (GPON). In this case, it is defined that the WAN connection of the home gateway is the ADSL, the Ethernet or the EPON/GPON.

E8 is a home gateway provided by China Telecom, and E8C is a C-type home gateway provided by China Telecom. Home gateways of China Telecom are managed using the TR069 protocol. Fiber-to-the-x (FTTx) refers to fiber access, wherein x refers to an access point. Fiber-to-the-Building (FTTB) refers to the extension of fiber to a building, and Fiber-to-the-Home (FTTH) refers to the extension of fiber to a home.

The main problems which FTTH faces are as follows: 1, the connection to home is difficult to realize as it is difficult to deploy optical fibers; 2, the problem of the shortage of construction fund is prominent because of the high cost of FTTH; and 3, the secondary splitting of optical fibers also increases the construction cost of FTTH. FTTB faces such problems that non-operators are in a passive position in FTTB popularization, the installation rate of FTTB cannot be checked conveniently and the supply of power is not guaranteed fully.

To address the problems currently existing in FTTH and FTTB, a new optical fiber access solution is provided which is called enhanced FTTH. In this solution, a card insertion scheme is used. Referring to FIG. 1, an ONU is made into a sub-card and each sub-card is an independent ONU. The ONU is inserted into a machine frame that can be flexibly positioned in a corridor or at a gate. With the existing cables (network lines or telephone lines) for the connection to a home, each card can flexibly provide an access mode to support a broadband access and a voice service without changing the current installation flow of FTTH, thereby guaranteeing the supply of power and minimizing the construction cost. The enhanced FTTH device shown in FIG. 1 is implemented as follows: an independent Central Processing Unit (CPU) and an independent Passive Optical Network Media Access Control (PONMAC) module are provided on each sub-card, that is, each interface card is provided with the circuit of a standard ONU, and all sub-cards share one optical module. Referring to FIG. 1 in detail, a downlink data stream is sent to each PONMAC via a Field Programmable Gate Array (FPGA), the PONMAC finds its own data by filtering. In the uplink direction, only one PONMAC can send data at a time, which is realized by the FPGA using a high-speed switch. When a certain ONU needs to send data, the ONU connects its PONMAC to the high-speed switch. As such, each ONU is unaware of the existence of the other ONUs. The implementation scheme shown in FIG. 1 is relatively simple in terms of software implementation because of no need for changing existing ONU software. The following problems, however, exist.

(1) It has high hardware cost. Each ONU is configured with a CPU and a PONMAC. In particular, a FPGA is introduced for sharing an optical module, which leads to a sharp increase in cost as the number of the sub-cards increases.

(2) The FPGA cannot switch among the ONUs rapidly as the uplink interface rate increases, resulting in a bottleneck in the uplink interface rate. Therefore, it is impossible to introduce an uplink interface with a higher speed.

SUMMARY

The present disclosure is intended to provide an ONU, an ONU setting method, a communication system and a communication method to address the problems of high hardware cost of existing ONUs and limitation to the uplink interface rate due to switch by the FPGA.

According to an embodiment of the present disclosure, an ONU is provided which includes a processing module and at least two user interface modules, wherein the processing module includes at least two ONU sub-modules which are corresponding to the user interface modules, respectively, in a one-to-one manner. Each of the at least two ONU sub-modules processes the user side data from a corresponding user interface module and send data from a network side to a corresponding user interface module.

According to an embodiment of the present disclosure, the at least two ONU sub-modules included in the processing module are independent from each other.

According to an embodiment of the present disclosure, each of the ONU sub-modules includes an ONU process processing unit, an ONU routing unit and a first bridge unit which are connected to each other in sequence.

The first bridge unit is configured to store port information of the ONU sub-module and send the data from a user side to the ONU process processing unit via the ONU routing unit, and the first bridge units of the ONU sub-modules are isolated from each other.

The ONU routing unit is configured to set up a routing table for the ONU sub-module.

The ONU process processing unit is configured to process the received user side data.

According to an embodiment of the present disclosure, the processing module includes a second bridge unit which is connected to the first bridge unit of each of the ONU sub-modules and is configured to perform a port translation on the data from a user side and send the translated data to a corresponding first bridge unit and receive the network side data from the first bridge unit and send the received network side data to a corresponding user interface module.

According to an embodiment of the present disclosure, each of the ONU sub-modules further includes a logic database which is connected to the ONU process processing unit and is configured to store data of the corresponding ONU sub-module, and the logic databases of the ONU sub-modules are isolated from each other.

According to an embodiment of the present disclosure, each of the ONU sub-modules is corresponding to an IP address; and the ONU routing unit includes an IP address corresponding to the ONU sub-module in a routing table set for the ONU sub-module to which the ONU routing unit belongs.

According to an embodiment of the present disclosure, the ONU has a shared IP address which is used by each of the ONU sub-modules to send data to the network side.

According to an embodiment of the present disclosure, the ONU further includes an optical module, a passive optical network medium access control module and a switch module, wherein the optical module is connected to the passive optical network medium access control module which is connected to the processing module, and each of the user interface modules is connected to a corresponding ONU sub-module via the switch module. The optical module converts the received network side data and sends the converted network side data to the processing module via the passive optical network medium access control module.

According to an embodiment of the present disclosure, each of the user interface modules consists of a user interface circuit.

According to an embodiment of the present disclosure, a communication system is also provided which includes an optical line terminal and the foregoing ONU, wherein the optical line terminal is communicatively connected to the ONU.

According to an embodiment of the present disclosure, the communication system further includes an integrated terminal management system communicatively connected to the ONU.

According to an embodiment of the present disclosure, a communication method for an ONU is provided which includes the following steps.

An user interface module of the ONU receives data from a user side and sends the data to a corresponding one of at least two ONU sub-modules included in a processing module of the ONU; and The ONU sub-module processes the user side data from a corresponding user interface module.

According to an embodiment of the present disclosure, the communication method for an ONU further includes that the ONU sub-module receives data from a network side and sends the received data to a corresponding user interface module.

The present disclosure has the following advantages:

The ONU provided herein includes a processing module and at least two user interface modules. At least two ONU sub-modules are provided in the processing module and are corresponding to the user interface modules, respectively, in a one-to one manner. Each of the ONU sub-modules processes user side data from a corresponding user interface module and sends data from a network side to a corresponding user interface module. It can be known that only by arranging, on a user interface card, a user interface circuit which cooperates with a corresponding ONU sub-module in a processing module, the ONU provided herein can achieve all the functions of an existing ONU without arranging a CPU, a PON MAC and the like on each user interface card. Furthermore, an FPGA for switching among ONUs is not necessary. Therefore, the hardware cost of the ONU provided herein is greatly reduced, and the limitation to the ONU by FPGA switching is broken, thereby enhancing an uplink interface rate.

BRIEF DESCRIPTION OF THE DRAWINGS

FIG. 8 is a flowchart illustrating transmission of a downlink data stream according to an embodiment of the present disclosure.

DETAILED DESCRIPTION

An ONU according to the present disclosure includes a processing module and at least two user interface modules, wherein at least two ONU sub-modules are provided in the processing module and are corresponding to the user interface modules in a one-to-one manner. The user interface modules are connected to the ONU sub-modules through a switch module.

As can be seen, according to the ONU provided herein, there is no need to provide a CPU, a PON MAC and the like on each user interface card. Instead, only a user interface circuit is provided on the user interface card, and thus forms an existing ONU along with a corresponding ONU sub-module in the processing module, thereby achieving all the functions of the existing ONU. Furthermore, there is no need to include an FPGA for switching among ONUs. Therefore, the hardware cost of the ONU provided herein is greatly reduced, and the limitation to the ONU by FPGA switching is broken, thereby enhancing an uplink interface rate. In order to be better understood, the present disclosure is further described below with reference to specific embodiments.

Figure 1:
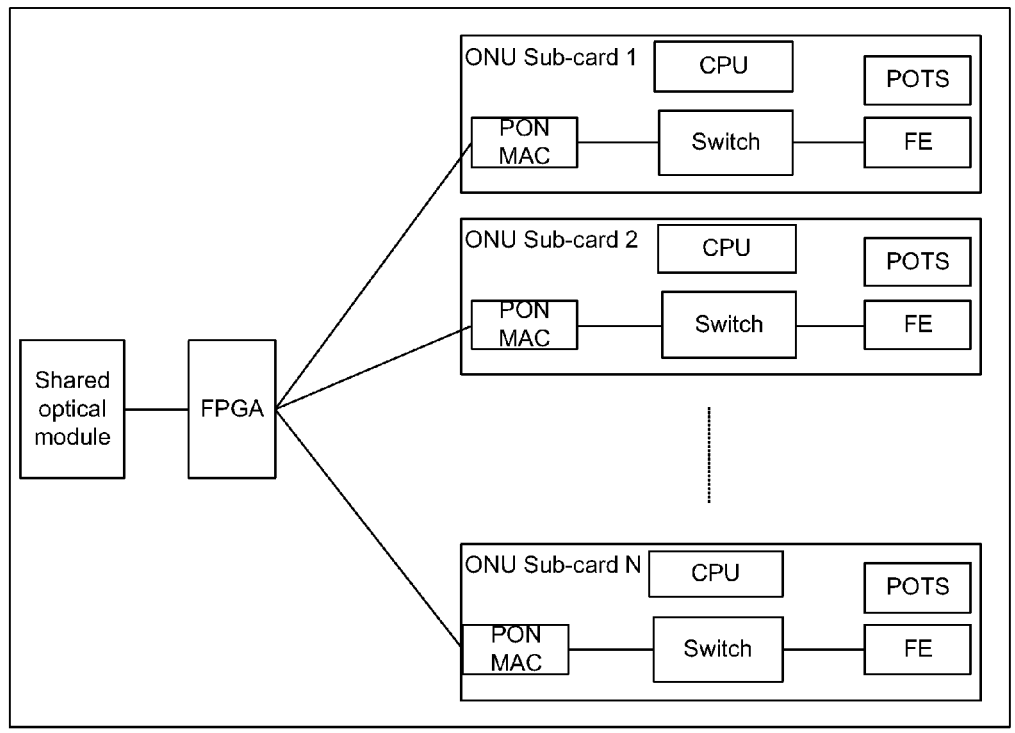
FIG. 1 is a schematic diagram illustrating a structure of an ONU.
Figure 2:
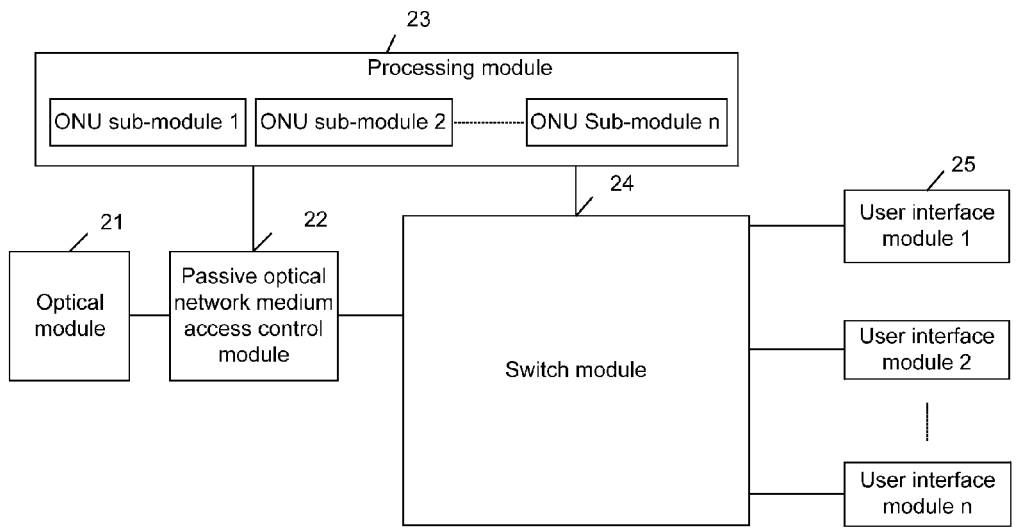
FIG. 2 is a schematic diagram illustrating a structure of an ONU according to an embodiment of the present disclosure.

Referring to FIG. 2, FIG. 2 is a schematic diagram illustrating the structure of an ONU according to an embodiment of the present disclosure. As shown, the ONU includes an optical module 21, a Passive Optical Network Media Access Control module (PON MAC) 22, a processing module (CPU) 23 and a switch module (Switch) 24 which are sequentially connected with each other. The ONU further includes at least two user interface modules 25 which are connected to the processing module 23 via the switch module 24.

In the embodiment, the user interface modules 25 may still be implemented as interface cards. However, only a user interface circuit is provided on each of the user interface cards, such as, a Fast Ethernet (FE) interface circuit and/or a Plain Old Telephone Service (POTS) interface circuit, etc.

As can be seen in the embodiment, it is not needed to provide a CPU, a PON MAC and the like on each interface card, and thus, the hardware cost of the ONU is reduced.

In addition, in the embodiment, at least two ONU sub-modules are provided in the processing module (CPU) and the provided ONU sub-modules are corresponding to the user interface modules in a one-to-one manner, and the user interface modules are connected to the corresponding ONU sub-modules via the switch module respectively.

In the embodiment, the provided ONU sub-modules are independent (isolated) from each other. That is, each ONU sub-module is unaware of the existence of the other ONU sub-modules.

The specific functions of the above-mentioned modules are described as follows.

The user interface modules 25 are configured to receive data from a user side and forward the received data to the processing module 23 via the switch module and forward data forwarded from a network side by the processing module 23 via the switch module 24 to the user side.

The switch module 24 is configured to forward data between the processing module 23 and the user interface modules 25.

The processing module 23 is configured to process the data from the user side and the data from the network side.

The PON MAC module 22 is configured to control access of the optical module 21.

The optical module 21 is configured to receive data from the network side, send data to the network side and perform a photoelectric signal conversion during the receiving and sending processes.

The processing module 23 consists of one or more ONU sub-modules, each of which has all the functions of the ONU except for a user interface function.

For better understanding, each functional module of the ONU sub-module is described below in detail.

It can be known from above that in the embodiment, the hardware of the ONU includes a CPU (may be a multi-core CPU), a SWITCH chip, a PONMAC and an optical module. A user interface such as an FE interface and/or a POTS interface is inserted into a machine frame as an interface card. There is no CPU, PONMAC or the like provided on the interface card. The interface on each interface card belongs to one user (that is, one user interface module is corresponding to one user). The interface cards (that is, user interface modules) share the CPU, the PONMAC and the optical module and are connected with each other via the SWITCH.

Although the enhanced FTTH in the embodiment is stilled implemented as a machine frame and the user interface corresponding to each ONU is still configured on an interface card, only the interface circuit at an ONU user side is provided on the interface card while the CPU, the PON MAC, the optical module and the switch chip are provided on a main board. Thus, all interface cards can share the CPU, the PON MAC and the optical module via a back plate bus, and data from a sub-card and a PON are distributed to the corresponding ONU sub-modules included in the processing module via software, thus simulating a plurality of existing ONUs.

Figure 3:
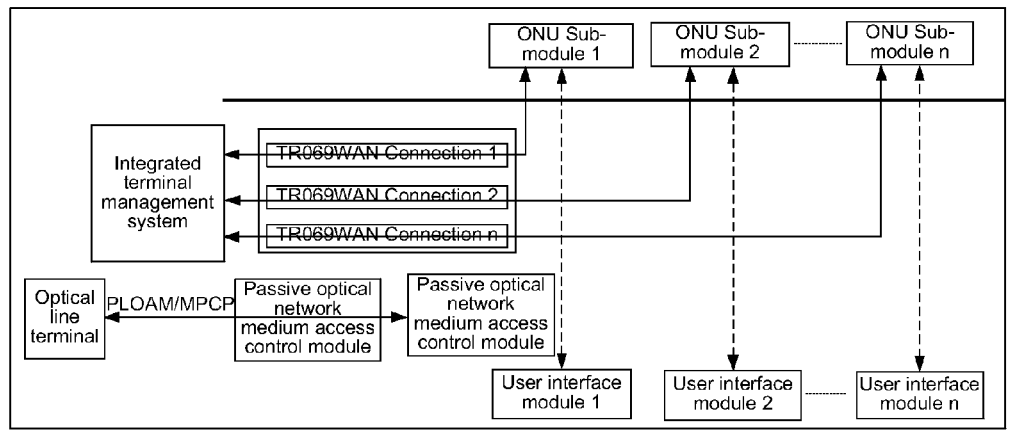
FIG. 3 is a schematic diagram illustrating connection of ONU sub-modules according to an embodiment of the present disclosure.

In the embodiment, after being registered on an OLT, that is, physically connected to the OLT, the ONU shown in FIG. 2 can only be detected as one ONU by the OLT. Thus, the ONU in the embodiment is applicable to a Home Gateway Unit (HGU)-type home gateway. Referring to FIG. 3, by using the TR069 protocol for access management, a fundamental physical link can be established between the ONU and the OLT only via Physical Layer Operations, Administration and Maintenance (PLOAM) or a Multipoint Control Protocol (MPCP). After the ONU is registered on the OLT, the following management procedure is implemented using the TR069 protocol and an Integrated Terminal Management System (ITMS). The TR069 protocol is born by an Internet Protocol (IP). Thus, a WAN connection to the ITMS is established by each ONU sub-module in the embodiment, and TR069 management messages are distributed to a corresponding ONU sub-module through a TR069 WAN connection.

First, a registration authentication processing is performed between each ONU sub-module and the ITMS. The authentication includes an initial connected device authentication and a non-initial connected device authentication. The initial connected device authentication includes initial connected device authentication based on a physical ID (e.g. a device serial number) and initial connected device authentication based on a logical ID (e.g. an account for broadband Internet access). Thus, in the embodiment, each user interface module is assigned with a physical ID and/or a logical ID which are a physical ID and/or a logical ID of the ONU sub-module corresponding to the user interface module. After the initial connected device authentication is successful, the ITMS can recognize an ONU sub-module according to the physical ID and/or logical ID and the TR069 WAN connection IP address. The non-initial connected device authentication is merely different from the initial connected device authentication in that a configuration process and a version issuing process are not involved.

Figure 5:
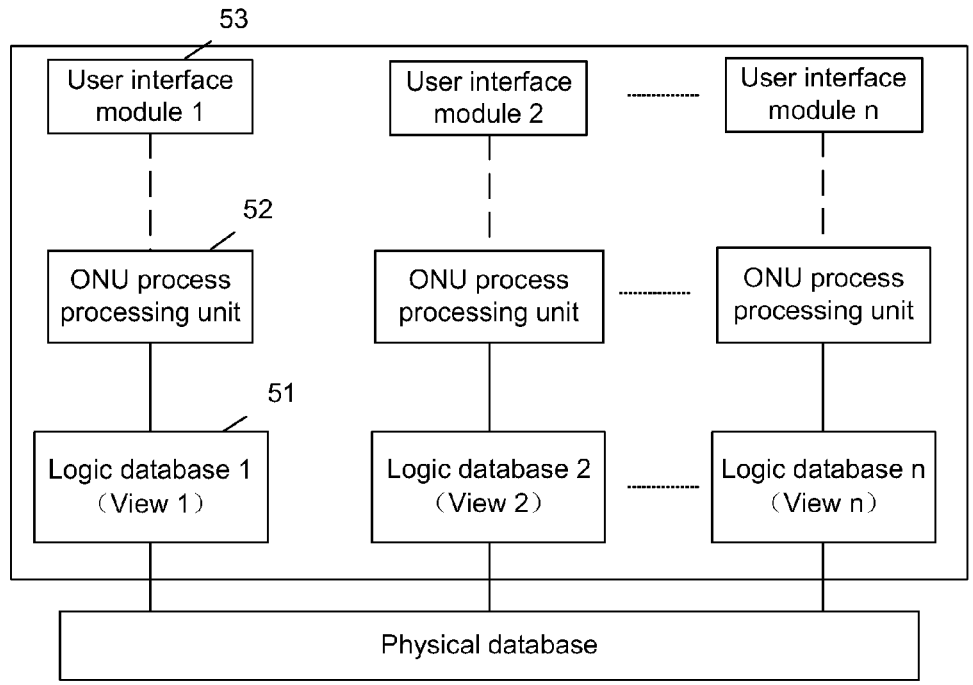
FIG. 5 is another schematic diagram illustrating a structure of an ONU sub-module according to an embodiment of the present disclosure.

To enable the ITMS to detect a plurality of ONU sub-modules on an ONU and each ONU sub-module to run independently, the ONU sub-module in the embodiment may specifically include the following functional units as shown in FIG. 5.

A logic database 51 is included in each ONU sub-module to enable a database system to distinguish among the data and configuration information of the plurality of ONU sub-modules. In the embodiment, the data of the plurality of ONU sub-modules may be stored in one data table. However, each ONU sub-module can only check the data thereof. That is, the logic databases of the plurality of ONU sub-modules are isolated from each other.

In the embodiment, the data of the ONU sub-module includes data running in an internal memory and a data table stored in a medium such as a FLASH or a hard disk. The data running in an internal memory includes the various data generated during a running process, including global configuration data, user data, running time data and so on. In the embodiment, the data running in the internal memory of each ONU sub-module is distinguished by setting an independent process or process group for the ONU sub-module and isolating the process using an operating system. Thus, each ONU sub-module is unaware of the existence of the other ONU sub-modules.

The data table stored in a medium is described below based on two different modes:

Mode 1: each ONU sub-module uses an independent table. The data tables can share the same name, but they use independent databases or are stored in different paths. By finding the database or path thereof, each ONU sub-module can operate the data table thereof. Apparently, the names of the data tables may be different. In this case, only one database may be used.

Mode 2: all ONU sub-modules share one data table which is stored in one database or path. In the data table, a key field is used to indicate which ONU sub-module a record in the data table belongs. For the sake of a convenient operation, a data view is established for each ONU sub-module in the embodiment, and each ONU sub-module can only check and operate its own data record.

In the way described above, the data table and run time data of each ONU sub-module can be distinguished to isolate ONU sub-modules from each other. In the embodiment, it can be implemented using views as shown in FIG. 5. Each ONU sub-module creates its own view by means of which the ONU sub-module can only operate its own data.

The ONU process processing unit 52 is set for each ONU sub-module.

In a user mode, each set ONU process processing unit has one or a group of processes. One user interface module 53 is bound with the ONU process processing unit of one ONU sub-module which carries out a corresponding processing for the data received from a user side. A user interface module may correspond to an ONU process processing unit based on the identification information (e.g. a slot position number, a device serial number and so on) of the user interface module.

Figure 4:
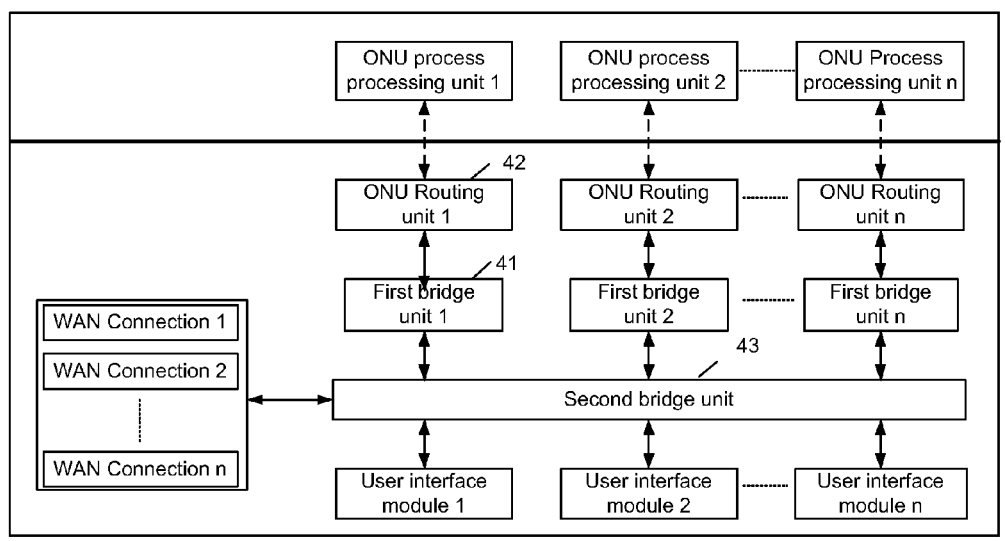
FIG. 4 is one schematic diagram illustrating a structure of an ONU sub-module according to an embodiment of the present disclosure.

Referring to FIG. 4, in the embodiment, a physical ID (e.g. a device serial number) and/or a logical ID may also be assigned to each user interface module (that is, a sub-card) to establish a corresponding TR069 WAN connection for device registration.

A first bridge unit 41 is provided for each ONU sub-module.

In the embodiment, in order to support a plurality of ONU sub-modules, in addition to separation of data in the user mode, the protocol stack in a kernel mode also needs to be separated so as to determine to which ONU sub-module a user interface module corresponds and perform a corresponding operation. The protocol stack in a kernel includes, from the bottom to the top, an Ethernet drive, a bridge, an IP-layer router, a transmission layer and an interface for a process in the user mode.

In the physical bridge module (that is, the two-layer bridge of a kernel) of the existing protocol stack, the port data needs to be flooded to the other ports in the physical bridge. If the ports of all ONU sub-modules are positioned in one physical bridge, then data is flooded between the ONU sub-modules. Thus, in the embodiment, it is needed to arrange the first bridge unit for each ONU sub-module on the physical bridge of a protocol stack so as to store the port information belonging to the same ONU sub-module in the first bridge unit. In the embodiment, the port information of an ONU sub-module includes the information of each port included in the user interface module corresponding to the ONU sub-module.

The data between the first bridge units of different ONU sub-modules are isolated from each other so that the broadcast packets sent from a port in the first bridge unit cannot be flooded to the ports of other first bridge units. However, the mechanism of the first bridge unit is not needed by the multicast protocol and the multicast stream on a virtual ONU since a multicast module itself limits the distribution port of a multicast stream. In the embodiment, the physical bridge of a protocol stack is replaced by the first bridge unit, and thus the physical bridge in the embodiment is only responsible for the translation from a physical bridge port to the first bridge unit port and receiving and sending of data at a physical port, not having the flooding function of conventional physical bridges.

An ONU routing unit 42 is provided for each ONU sub-module on the IP layer of a protocol stack. Because each ONU sub-module has its own WAN connection and the user interface corresponding to an ONU sub-module can only be connected to the outside via the WAN connection of the ONU the user interface belongs to, a dedicated ONU routing unit and a dedicated routing table are provided for each ONU sub-module in the embodiment. Correspondingly, a firewall module is also modified accordingly, and an ACL configuration rule is only applied to the inside of the ONU sub-module rather than across corresponding ports of the ONU sub-module.

In the embodiment, in order to enable the transmission layer of a protocol stack to distinguish among connections of different users, an IP address may be assigned to each ONU sub-module. The ONU routing unit of each ONU sub-module acquires the IP address of the ONU sub-module to set a routing table for the ONU sub-module. Moreover, in order to cater to the usage habit of the user, a shared IP address may also be set for an ONU so that each ONU subunit in the ONU can share the IP address. Specifically, each ONU sub-module uses the shared IP address to send data to a network side. In the embodiment, one of the ONU subunits included in the ONU can use the shared IP address of the ONU as its own IP address, vice versa. Further description is provided with reference to a specific implementation mode.

Figure 6:
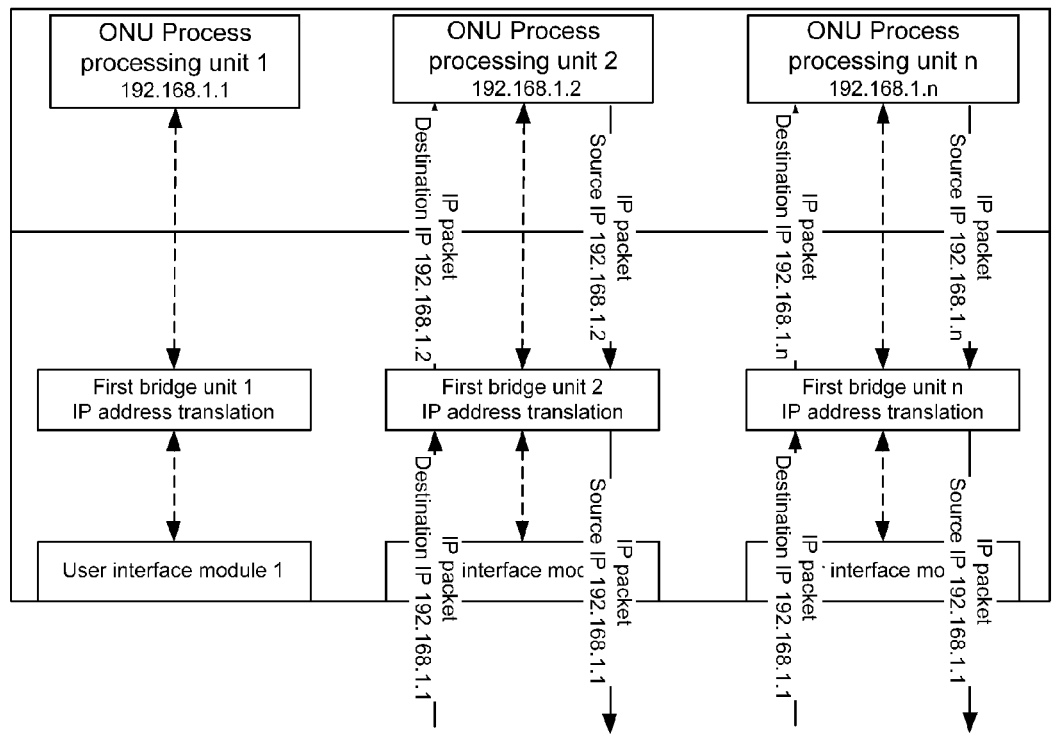
FIG. 6 is a schematic diagram illustrating assignment of an IP address for an ONU sub-module according to an embodiment of the present disclosure.

As shown in FIG. 6, since the local IP address of each ONU is generally set to be 192.168.1.1 at present, the user can log in 192.168.1.1 to access the ONU. In the case where an ONU includes a plurality of virtual ONU sub-modules, in order to accord with the habits of the users, each user logs in 192.168.1.1. Since the addresses of the users may be the same, the connection of each user cannot be distinguished on the transmission layer of a protocol stack using a five-element form. Thus, in the embodiment, each ONU sub-module uses a different IP address from the others. That is, each ONU sub-module is assigned with an IP address. For example, an ONU includes eight ONU sub-modules, the first of which uses an IP address of 192.168.1.1, the second one of which uses an IP address of 192.168.1.2, and so on until the eighth uses an IP address of 192.168.1.8, and the shared IP address of the ONU may be an optional one of the eight IP addresses or another separately set IP address. The embodiment is described below based on an example of the use of the IP address '192.168.1.1' of the first ONU sub-module as a shared IP address. For example, in order to enable the user of the eighth ONU sub-module to access the ONU in the IP address of 192.168.1.1, a translation may be carried out when an IP packet passes the first bridge unit to convert the destination IP, for example, 192.168.1.1 of an IP packet sent from a network side to 192.168.1.8 and the source IP, for example, 192.168.1.8 of an IP packet sent from a user side to 192.168.1.1. Thus, an IP address translation table is put at the processing point of the first bridge unit to enable each ONU user to access the ONU by use of the address of 192.168.1.1. To match this function, these IP addresses of 192.168.1.1-192.168.1.8 cannot be assigned any longer to the ONU users when addresses are assigned by a Dynamic Host Configuration Protocol (DHCP) server. The specific number of the IP addresses that should be reserved is equal to the number of the ONU sub-modules.

As can be seen from the foregoing analysis, the processing module further includes a physical bridge (that is, a second bridge unit) in the embodiment.

As shown in FIG. 4, the second bridge unit 43 is configured to perform a port translation for the data from a user side and send the translated data to a corresponding first bridge unit and receive network-side data sent from a first bridge unit and send the received data to a user interface module. Specifically, on an uplink, a physical port is translated to a virtual port corresponding to a first bridge, and then is forwarded to a corresponding first bridge unit. On a downlink, the virtual port of a first bridge unit is translated to a physical port. The user interface module is connected with the first bridge unit of a corresponding ONU sub-module via the second bridge unit.

Based on the plurality of ONU sub-modules provided in the processing module, a plurality of ONUs can be registered successfully and enter a serve state at the same time in the hardware architecture shown in FIG. 2.

The present disclosure will be further described in combination with the data streams in an uplink direction and a downlink direction in context of a virtual ONU sub-module.

Figure 7:
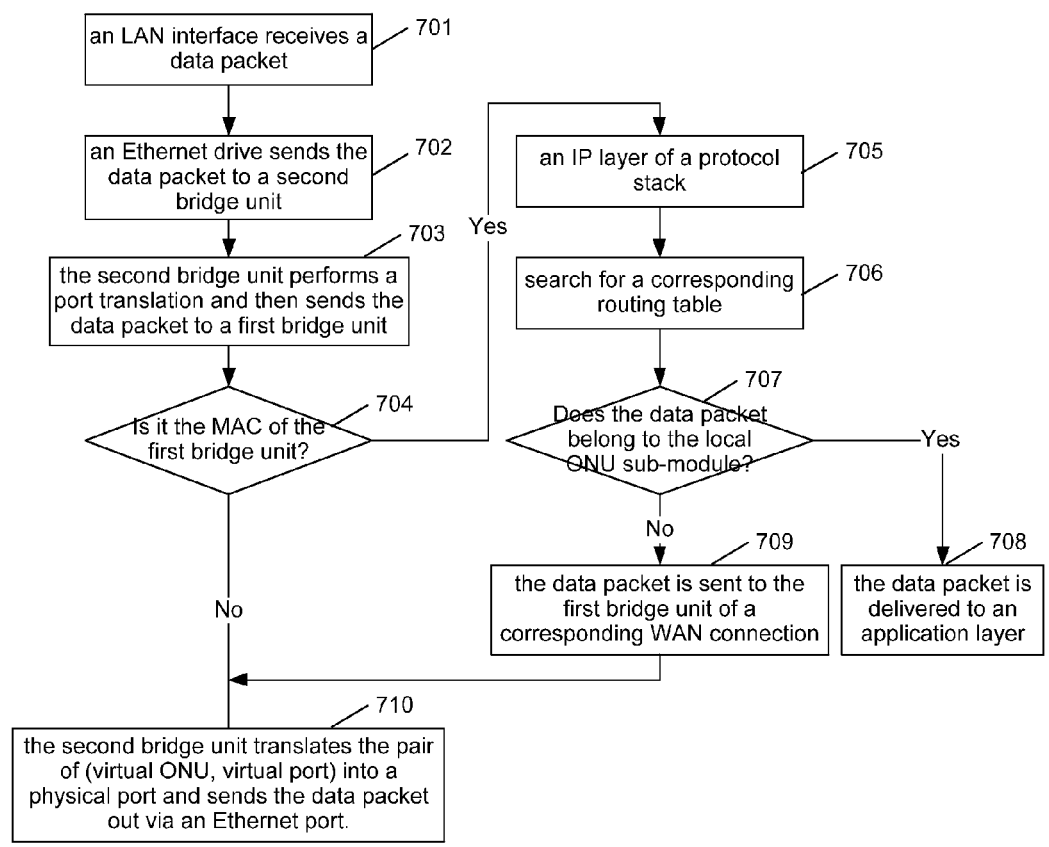
FIG. 7 is a flowchart illustrating transmission of an uplink data stream according to an embodiment of the present disclosure.

In the uplink direction, as shown in FIG. 7, the processing includes:

Step 701: after receiving a data packet, a user interface (a LAN port) on a user interface module forwards the data packet to a processing module, CPU, via a switch chip, Switch.

Step 702: after receiving the data packet, the Ethernet drive of a kernel (that is, a bottom module of a physical bridge) sends the data packet to a physical bridge of a protocol stack (that is, a second bridge unit).

Step 703: the second bridge unit translates a user port into a pair of a virtual ONU and a virtual port and then sends the data packet to a first bridge unit corresponding to the virtual port for a further processing.

Step 704: the first bridge unit determines a destination MAC of the data packet to make a determination on forwarding the data packet via another port (including the port of the physical bridge which is specifically corresponding to an LAN interface on a user interface card) or delivering the data packet to a IP layer of a protocol stack. That is, the first bridge unit determines whether the destination MAC of the data packet is the MAC of the first bridge unit or not. If so, the flow proceeds to Step 705; otherwise, the flow proceeds to Step 710.

Step 705: the first bridge unit delivers the data packet to the IP layer of the protocol stack.

Step 706: an ONU routing unit corresponding to the IP layer searches a corresponding routing table for a route.

Step 707: the ONU routing unit determines whether or not the data packet belongs to the local ONU sub-module. If so, the flow proceeds to Step 708; otherwise, the flow proceeds to Step 709.

Step 708: the data packet is sent to the ONU process processing unit of a corresponding ONU sub-module via a socket interface. That is, the data packet is uploaded to an application layer to be processed, and then the processing ends.

Step 709: the first bridge unit corresponding to the WAN connection is found via the routing table, and the data packet is forwarded to the first bridge unit.

Step 710: the data packet is sent to the second bridge unit of the protocol stack, and the second bridge unit of the kernel translates the pair of (virtual ONU, virtual port) into a physical port and sends the data packet out via an Ethernet port.

In the downlink direction, as shown in FIG. 8, the processing includes:

Step 801: an uplink physical port (e.g. a WAN interface) receives a data packet.

Step 802: the destination MAC address and the VLAN (virtual local area network) information of the data packet are acquired.

Step 803: it is determined whether the destination MAC address is a broadcast address or not. If the destination MAC address is a broadcast address, the flow proceeds to Step 804; otherwise, the flow proceeds to Step 805.

Step 804: the data packet is flooded to all of first bridge units and sent to an IP layer.

Step 805: it is determined whether the destination MAC address is a multicast address or a multicast protocol or not. If the destination MAC address is a multicast address or a multicast protocol, the flow proceeds to Step 806; otherwise, the flow proceeds to Step 807.

Step 806: the data packet is directly sent to a multicast module.

Step 807: the destination MAC address of the data packet is searched in the MAC address table of a WAN connection. If destination MAC address of the data packet is found in the MAC address table, the flow proceeds to Step 808; otherwise, the flow proceeds to Step 809.

Step 808: the data packet is sent to a corresponding WAN connection.

Step 809: the destination MAC address of the data packet is searched in an MAC address table learned at a LAN side. If destination MAC address of the data packet is found in the MAC address table, the flow proceeds to Step 810; otherwise, the flow proceeds to Step 811.

Step 810: the data packet is sent to a corresponding first bridge unit, i.e., a virtual bridge. If the data packet is a broadcast message, the data packet needs to be copied for each first bridge unit.

Step 811: the data packet is discarded.

As can be seen, according to the ONU provided herein, there is no need to arrange a CPU, a PON MAC and the like on each user interface card. Instead, only a user interface circuit is provided on the user interface card, and thus achieves all the functions of existing ONU by means of matching with a corresponding ONU sub-module in the processing module. Furthermore, there is no need to include an FPGA for switching ONUs. Therefore, the hardware cost is greatly reduced, and the limitation to the ONU by FPGA switching is broken, thereby enhancing the uplink interface rate.

The foregoing is detailed description of the present disclosure with reference to specific preferred embodiments which are not to be construed as limiting the present disclosure. All the various simple deductions or substitutes that can be devised by those skilled in the art without departing from the concept of the present disclosure fall within the protection scope of the present disclosure.

What is claimed is:

1. An Optical Network Unit (ONU), comprising: a processing module and at least two user interface modules, wherein the processing module is configured to process user side data from the user interface modules and send a network side data to the user interface modules; and the user interface modules are configured to send the user side data to the processing module and receive the network side data from the processing module, wherein the processing module comprises at least two ONU sub-modules which corresponds to the user interface modules, respectively, in a one-to-one manner, wherein each of the ONU sub-modules comprises an ONU process processing unit, an ONU routing unit and one or more first bridge units, wherein the first bridge unit is configured to store port information of the ONU sub-module and send the user side data to the ONU process processing unit via the ONU routing unit;

the ONU routing unit is configured to set up a routing table; and the ONU process processing unit is configured to process received user side data, wherein the one or more first bridge units are isolated from each other.

2. The ONU according to claim 1, wherein the at least two ONU sub-modules of the processing module are independent from each other.

3. The ONU according to claim 1, wherein the processing module comprises:

a second bridge unit, connected to the first bridge unit of each of the ONU sub-modules, and configured to perform a port translation on the user side data and send translated data to a corresponding first bridge unit and receive the network side data from the first bridge unit and send received network side data to a corresponding user interface module.

4. The ONU according to claim 1, wherein each of the ONU sub-modules further comprises:

a logic database, connected to the ONU process processing unit and configured to store data from the corresponding ONU sub-module, wherein the logic databases of the ONU sub-modules are isolated from each other.

5. The ONU according to claim 1, wherein each of the ONU sub-modules corresponds to an IP address; and the ONU routing unit comprises an IP address corresponding to the ONU sub-module in a routing table set for the ONU sub-module to which the ONU routing unit belongs.

6. The ONU according to claim 5, wherein the ONU has a shared IP address which is used by each of the ONU sub-modules to send data to the network side.

7. The ONU according to claim 1, further comprising: an optical module, a passive optical network medium access control module and a switch module, wherein the optical module is connected to the passive optical network medium access control module which is connected with the processing module, and each of the user interface modules is connected to a corresponding ONU sub-module via the switch module; and the optical module is configured to convert the received network side data and send the converted network side data to the processing module via the passive optical network medium access control module.

8. The ONU according to claim 1, wherein each of the user interface modules consists of a user interface circuit.

9. A communication system, comprising: an optical line terminal and an ONU, wherein the ONU is the ONU according to claim 1, and the optical line terminal is communicatively connected to the ONU.

10. The communication system according to claim 9, further comprising: an integrated terminal management system communicatively connected to the ONU.

11. A communication method for an ONU, comprising:

receiving, by an user interface module of the ONU, data from a user side and sending the data to a corresponding one of at least two ONU sub-modules included in a processing module of the ONU; and processing, by the ONU sub-module, the user side data from a corresponding user interface module, wherein each of the ONU sub-modules comprises an ONU process processing unit, an ONU routing unit and one or more first bridge units, wherein the first bridge unit is configured to store port information of the ONU sub-module and send the user side data to the ONU process processing unit via the ONU routing unit;

the ONU routing unit is configured to set up a routing table; and the ONU process processing unit is configured to process received user side data, wherein the one or more first bridge units are isolated from each other.

12. The communication method according to claim 11, further comprising:

receiving, by the ONU sub-module, data from a network side and sending the received data to a corresponding user interface module.

* * * * *